(12) United States Patent
McBride et al.

(10) Patent No.: US 9,024,721 B2
(45) Date of Patent: May 5, 2015

(54) APPARATUS FOR AUTOMATICALLY CHANGING STATE OF VEHICLE CLOSURE

(75) Inventors: Justin P. McBride, South Lyon, MI (US); Thomas J. Keeling, Novi, MI (US); Keiichi Aoyama, Toki (JP); Tanemichi Chiba, Nagoya (JP); Michael A. Wiegand, Birmingham, MI (US); Christopher M. Kurpinski, Berkley, MI (US)

(73) Assignee: DENSO International America, Inc., Southfield, MI (US)

( * ) Notice: Subject to any disclaimer, the term of this patent is extended or adjusted under 35 U.S.C. 154(b) by 435 days.

(21) Appl. No.: 13/223,529

(22) Filed: Sep. 1, 2011

(65) Prior Publication Data

US 2011/0316669 A1    Dec. 29, 2011

Related U.S. Application Data

(63) Continuation-in-part of application No. 11/363,144, filed on Feb. 27, 2006.

(51) Int. Cl.
| | | |
|---|---|---|
| *G08B 13/181* | (2006.01) |
| *G05B 19/00* | (2006.01) |
| *G06F 7/00* | (2006.01) |
| *H04B 1/00* | (2006.01) |
| *B60R 25/24* | (2013.01) |
| *G07C 9/00* | (2006.01) |

(52) U.S. Cl.
CPC ............. *B60R 25/245* (2013.01); *B60R 25/246* (2013.01); *G07C 9/00309* (2013.01); *G07C 2009/00333* (2013.01); *G07C 2009/00793* (2013.01); *G07C 2209/65* (2013.01)

(58) Field of Classification Search
CPC ...... G08B 13/181; G08B 29/00; B60R 25/00; G05B 19/00; G06F 7/00; H04B 1/00
USPC ............. 340/5.72, 5.61, 5.62, 5.2, 5.23, 5.71, 340/572; 307/10.1; 455/134, 226.2, 420; 341/173
See application file for complete search history.

(56) References Cited

U.S. PATENT DOCUMENTS

| | | | |
|---|---|---|---|
| 5,416,471 A | | 5/1995 | Treharne et al. |
| 5,600,323 A | | 2/1997 | Boschini |
| 5,602,535 A | | 2/1997 | Boyles et al. |
| 5,650,774 A | | 7/1997 | Drori |
| 5,886,634 A | * | 3/1999 | Muhme ...................... 340/572.1 |
| 6,101,428 A | * | 8/2000 | Snyder ............................. 701/2 |
| 6,158,882 A | * | 12/2000 | Bischoff, Jr. ................... 362/488 |
| 6,275,141 B1 | | 8/2001 | Walter |
| 6,518,882 B2 | | 2/2003 | Johnson et al. |
| 6,552,649 B1 | | 4/2003 | Okada et al. |
| 6,765,471 B1 | * | 7/2004 | Baudard et al. .............. 340/5.61 |
| 6,995,653 B2 | * | 2/2006 | Takahashi et al. ........... 340/5.71 |

(Continued)

*Primary Examiner* — Nam V Nguyen
(74) *Attorney, Agent, or Firm* — Harness, Dickey & Pierce, P.L.C.

(57) ABSTRACT

An apparatus for changing the state of a vehicle closure is disclosed. The apparatus includes a primary mobile unit, a secondary mobile unit, and a detection device. The detection device is operable to automatically detect whether the primary mobile unit is within a first range of the detection device, and whether the secondary mobile unit is within a second range of the detection device. The apparatus further includes a controller operable to change the state of the vehicle closure when the detection device detects that the secondary mobile unit is within the second range while the primary mobile unit is detected within the first range.

23 Claims, 3 Drawing Sheets

(56) References Cited

U.S. PATENT DOCUMENTS

| | | |
|---|---|---|
| 7,015,791 B2 | 3/2006 | Huntzicker |
| 7,064,651 B2 | 6/2006 | Goetz |
| 7,102,487 B2 * | 9/2006 | Mafune et al. .................. 340/5.7 |
| 7,106,170 B2 | 9/2006 | Wang |
| 7,227,446 B2 * | 6/2007 | Kumazaki et al. ........... 340/5.61 |
| 7,438,346 B1 * | 10/2008 | Breed ......................... 296/146.4 |
| 7,474,199 B2 * | 1/2009 | Nakashima et al. ....... 340/426.1 |
| 7,545,255 B2 | 6/2009 | Ohtaki et al. |
| 7,683,757 B2 * | 3/2010 | King et al. ................... 340/5.72 |
| 7,696,859 B2 * | 4/2010 | Teshima et al. .............. 340/5.72 |
| 7,916,021 B2 * | 3/2011 | Lickfelt et al. ................ 340/571 |
| 2001/0038328 A1 | 11/2001 | King et al. |
| 2001/0054952 A1 * | 12/2001 | Desai et al. .................. 340/5.72 |
| 2005/0168322 A1 | 8/2005 | Appenrodt et al. |
| 2007/0085658 A1 | 4/2007 | King et al. |
| 2007/0120644 A1 * | 5/2007 | Seike .......................... 340/5.61 |
| 2007/0229219 A1 | 10/2007 | Nakashima et al. |

* cited by examiner

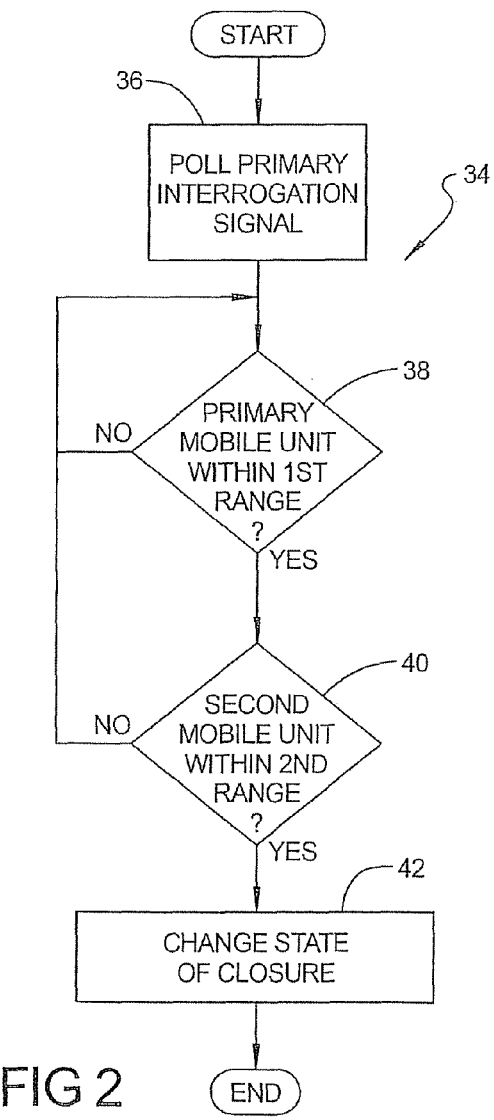
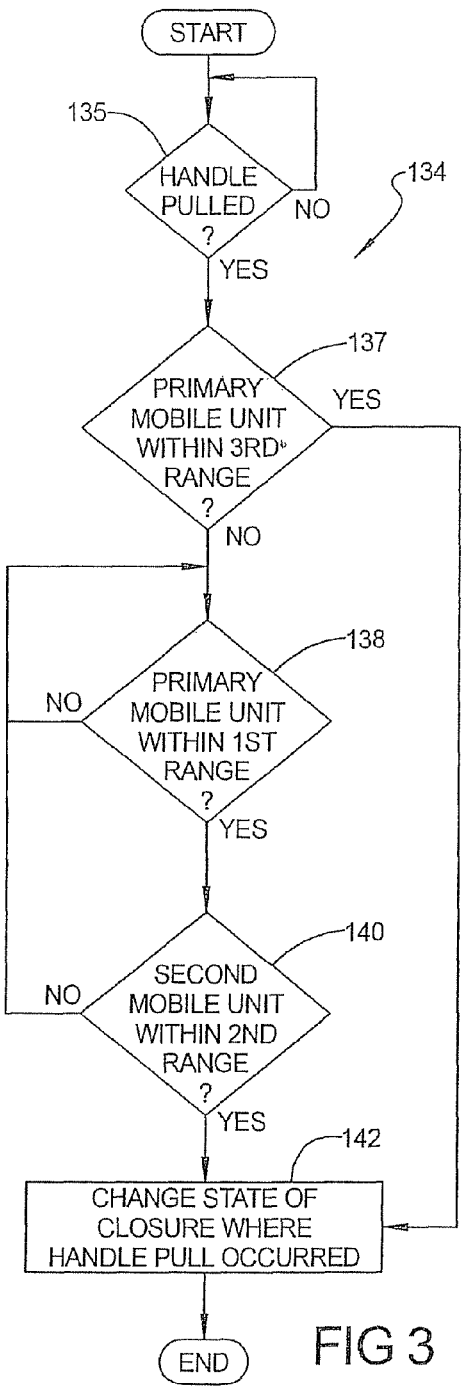
FIG 2
FIG 3 ations. The method further includes the step of changing the state of the vehicle closure when the secondary mobile unit is detected within the second range while the primary mobile unit is being detected within the first range.

APPARATUS FOR AUTOMATICALLY CHANGING STATE OF VEHICLE CLOSURE

CROSS-REFERENCE TO RELATED APPLICATIONS

This application is a continuation-in-part of U.S. patent application Ser. No. 11/363,144 filed on Feb. 27, 2006. The entire disclosure of the above application is incorporated herein by reference.

FIELD OF THE INVENTION

The present invention relates to a vehicle closure, and more specifically, to an apparatus for automatically changing the state of a vehicle closure.

BACKGROUND OF THE INVENTION

The state of a vehicle door can be changed in various ways. For instance, changing a vehicle door from a locked state to an unlocked state has traditionally been achieved by turning a key within a lock mounted to the door. More recent vehicle doors are unlocked and locked using a remote control device. More specifically, a button is pushed on the remote control to lock and/or unlock the door via wireless communication. In other modern methods, a key fob automatically communicates with the vehicle when the key fob is within range, and allows the door to be unlocked and opened.

While such improvements have worked for their intended purposes, some disadvantages remain. Using the example of the key fob system mentioned above, passengers may arrive at the vehicle before the person holding the key fob is within range. Accordingly, those passengers are inconvenienced because they will need to wait outside the vehicle until the key fob comes within range of the vehicle.

Furthermore, certain bulky items, such as golf clubs, car seats, and the like, are repeatedly placed in and taken out of the vehicle. The user typically places these large items on the ground, unlocks the vehicle door, opens the door, picks the large item back up and places it into the vehicle. This can be inconvenient. Certain systems have been developed that automatically open the vehicle door, such as applicant's co-pending patent application Ser. No. 11/301,706, filed Dec. 12, 2005. In one embodiment, this system advantageously opens the vehicle door as the user approaches the vehicle. However, some users may desire a door opening device that automatically opens the door only for certain items.

Accordingly, there remains a need for an apparatus that automatically unlocks a vehicle door for passengers that arrive at the vehicle before the user with the key fob. There also remains a need for such an apparatus that also automatically opens the door under certain circumstances.

SUMMARY OF THE INVENTION

An apparatus for changing the state of the vehicle closure is disclosed. The apparatus includes a primary mobile unit and a secondary mobile unit. The apparatus also includes a detection device operable to automatically detect whether the primary mobile unit is within a first range of the detection device. The detection device is also operable to detect whether the secondary mobile unit is within a second range of the detection device. The apparatus further includes a controller operable to change the state of the vehicle closure when the detection device detects that the secondary mobile unit is within the second range while the primary mobile unit is being detected within the first range.

In another aspect the present disclosure relates to a method of changing the state of a vehicle closure. The method includes the step of detecting when a primary mobile unit is within a first range of the detection device. The method also includes the step of detecting when a secondary mobile unit is within a second range of the detection device. The method further includes the step of changing the state of the vehicle closure when the secondary mobile unit is detected within the second range while the first mobile unit is being detected within the first range.

In still another aspect, the present disclosure relates to an apparatus for changing the state of a vehicle closure. The apparatus includes a primary mobile unit, a secondary mobile unit, and a detection device. The detection device is operable to transmit a primary interrogation signal within a first range and an energizing signal within a second range. The primary mobile unit is operable to transmit a primary identification signal in response to the primary interrogation signal. The secondary mobile unit is operable to obtain energy from the energizing signal and transmit a secondary identification signal. The detection device detects whether the primary mobile unit is within the first range by matching the primary identification signal to a predetermined primary identifier. The detection device detects whether the secondary mobile unit is within the second range by matching the second identification signal to a predetermined second identifier. The apparatus further includes a controller that is operable to change the state of the vehicle closure when the detection device detects that the secondary mobile unit is within the second range while the primary mobile unit is being detected within the first range. The state of the vehicle closure changes by changing the state of the vehicle closure from a locked state to an unlocked-standby state and/or changing the state of the vehicle closure from a closed state to an open state.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 2 is a flow chart illustrating one embodiment of a method of operating the vehicle closure control apparatus of FIG. 1;

FIG. 3 is a flow chart illustrating another embodiment of a method of operating the vehicle closure control apparatus of FIG. 1.

DETAILED DESCRIPTION OF THE PREFERRED EMBODIMENTS

The following description of the preferred embodiments is merely exemplary in nature and is in no way intended to limit the invention, its application, or uses.

Figure 1:
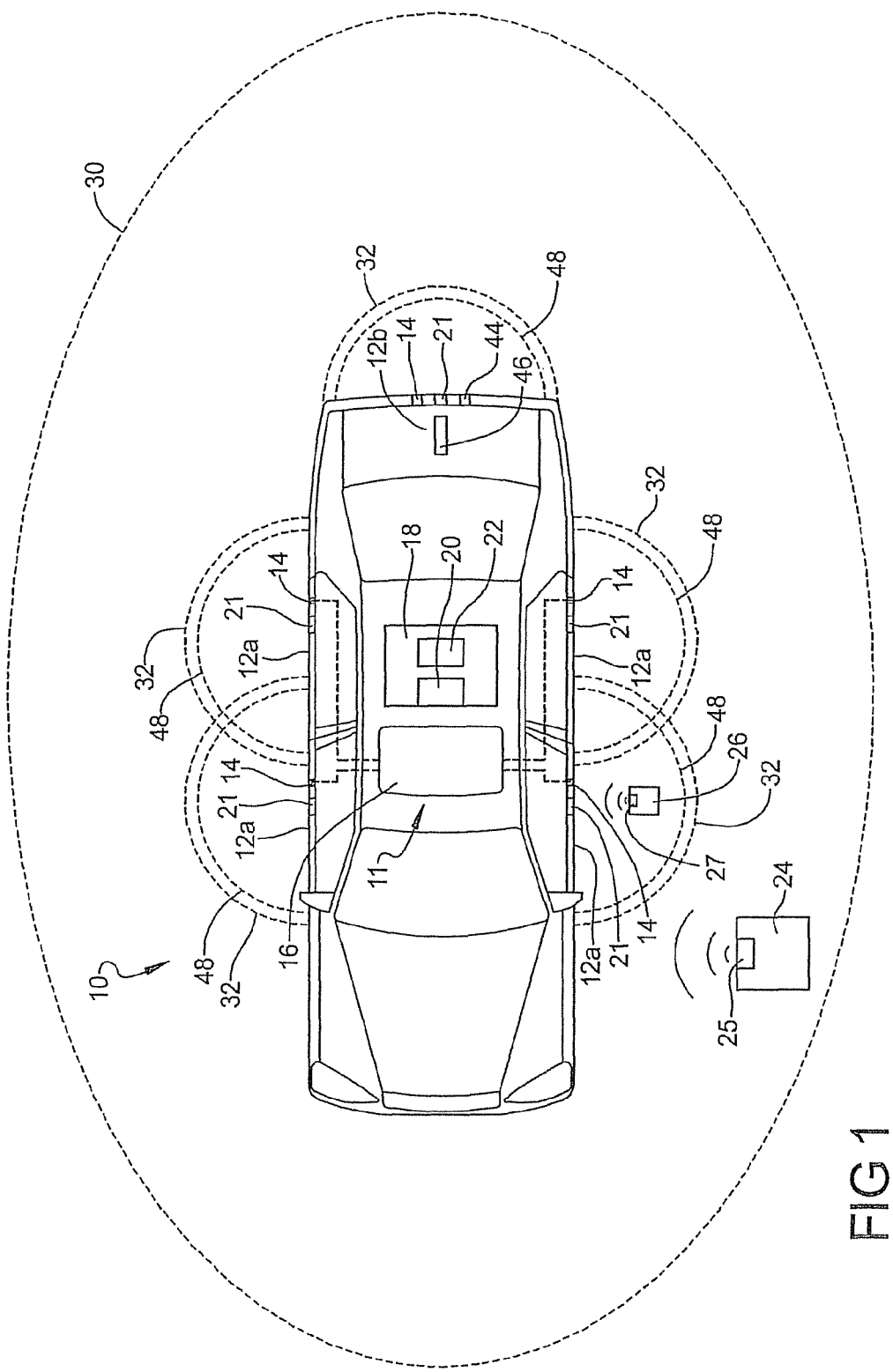
FIG. 1 is a top view of a vehicle equipped with a vehicle closure control apparatus.

With reference to FIG. 1, a vehicle 10 is illustrated. The vehicle 10 includes a vehicle closure control apparatus generally indicated at 11. The vehicle 10 also includes a plurality of closures 12. More specifically, the vehicle 10 includes a plurality of passenger compartment closures (i.e., vehicle doors) 12a and a trunk closure 12b. Those having ordinary skill in the art will appreciated that the vehicle control apparatus 11 could be employed in any suitable vehicle 10 having any suitable configuration of closures 12, such as hingeably attached doors, sliding doors, hatchbacks, gates, and the like. Each of the closures 12 include a closure locking mechanism 14, such as a door handle and an associated lock, which can be changed between a locked state, an unlock-standby state, and an unlocked state in a manner to be described below.

The vehicle closure control apparatus 11 includes a controller 16 and a detection device 18, both of which are operably attached to the vehicle 10. The detection device 18 generally includes a primary antenna 20, a receiver 22, and a plurality of second antennae 21. The second antennae 21 are each mounted to one of the closures 12 of the vehicle 10. The vehicle closure control apparatus 11 further includes a primary mobile unit 24 and a secondary mobile unit 26. The primary mobile unit 24 and the secondary mobile unit 26 are portable and can be carried within a pocket, purse, or other article. The primary mobile unit 24 includes a first transponder 25, and the secondary mobile unit 26 includes a second transponder 27.

As will be explained in greater detail below, the detection device 18 is generally operable to detect whether the primary mobile unit 24 is located within a predetermined range. The detection device 18 is similarly operable to detect whether the secondary mobile unit 26 is located within a predetermined range. If the primary mobile unit 24 and the secondary mobile unit 26 are each detected as being located within the respective ranges at the same time, the controller 16 changes the state of one or more of the vehicle closures 12. For instance, the controller 16 is able to unlock one or more of the vehicle closures 12 in one embodiment, and/or the controller 16 is operable to automatically open one or more of the vehicle closures 12.

For instance, a first range 30 is illustrated in FIG. 1. A plurality of second ranges 32 are depicted in FIG. 1 as well. (The boundaries of the first and second ranges are each depicted with a broken line in FIG. 1.) As shown, the boundary of the first range 30 lies outside the vehicle 10. Each of the second ranges 32 have boundaries disposed adjacent one of the closures 12. In the embodiment shown, each of the second ranges 32 are smaller than and are encompassed by the first range 30. In one embodiment, the boundary of the first range 30 is approximately twenty feet away from the vehicle 10. Also, in one embodiment, the boundary of the second range 32 is approximately three to five feet away from the vehicle 10. As will be explained, the controller 16 changes the state of the closure 12 when the secondary mobile unit 26 is disposed within one of the second ranges 32 while the primary mobile unit 24 is detected as being within the first range 30. Thus, if the primary mobile unit 24 moves out of the first range 30 before the secondary mobile unit 26 enters the second range 32, the controller 16 will not change the state of the closure 12.

In one embodiment, the primary antenna 20 of the detection device 18 transmits a primary interrogation signal outward from the vehicle 10. If the primary mobile unit 24 is within the first range 30, the first transponder 25 receives the primary interrogation signal and responds by transmitting a primary identification signal. Then, the detection device 18 attempts to match the primary identification signal to a predetermined primary identifier, such as a code stored in computer memory. If the primary identification signal matches the predetermined primary identifier, the detection device 18 has thereby validated the primary mobile unit 24 and confirmed that the primary mobile unit 24 is located within the first range 30.

Furthermore, the second antennae 21 of the detection device are each operable to transmit an energizing signal. If the second mobile unit 26 is located within one of the second ranges, the second transponder 27 of the secondary mobile unit 26 obtains energy from the energizing signal, which provides enough power to transmit a second identification signal. The receiver 22 of the detection device 18 attempts to match the second identification signal, and the detection device 18 matches the second identification signal to a predetermined second identifier, such as a code stored in computer memory. If the second identification signal matches the predetermined second identifier, the detection device 18 has validated the secondary mobile unit 26 and confirmed that the secondary mobile unit 26 is within the second range 32 of the vehicle 10. In one embodiment, the detection device 18 transmits the energizing signal only while the primary mobile unit 24 is detected within the first range 30 of the vehicle 10. As such, the vehicle closure control apparatus 11 conserves energy.

In one embodiment, the detection device 18 communicates with the primary mobile unit 24 and the secondary mobile unit 26 via radio frequency (RF) signals. In one embodiment, the primary interrogation signal transmitted by the antennae 20 is a radio frequency (RF) signal transmitted at 315 MHz. Furthermore, in one embodiment, the secondary mobile unit 26 is a radio frequency identification (RFID) tag. The RFID tag could be of any suitable type, such as a passive or battery assisted RFID tag. As is generally known, the passive RFID tag is energized by the incoming energizing signal transmitted from the antennae 20 of the detection device 18, and once energized, the secondary mobile unit 26 is able to respond by transmitting the second identification signal as described above. In a battery assisted RFID tag, no such energizing signal is required since a battery provides the energy necessary for transmissions.

In one embodiment, the boundary of the first range 30 is ultimately determined by the strength of the primary interrogation signal and the primary identification signal, and the primary mobile unit 24 effectively "enters the first range 30" as soon as the first transponder 25 begins communicating with the detection device 18. Likewise, the boundary of the second range 32 is ultimately determined by the strength of the second interrogation signal and the second identification signal, and the secondary mobile unit 26 effectively "enters the second range 32" as soon as the second transponder 27 begins communicating with the detection device 18.

In another embodiment, the detection device 18 is operable to detect the distance between the detection device 18 and the primary mobile unit 24 based on the strength of the primary identification signal received from the primary mobile unit 24 in a manner generally known in the art. As such, the boundary of the first range 30 is a predetermined distance from the detection device 18, and the primary mobile unit 24 effectively "enters the first range 30" as soon as the strength of the primary identification signal indicates that the primary mobile unit 24 is less than the predetermined boundary distance from the detection device 18. Furthermore, the detection device 18 is operable to detect the distance between the detection device 18 and the secondary mobile unit 26 based on the strength of the second identification signal. As such, the boundary of the second range 32 is predetermined, and the secondary mobile unit 26 effectively "enters the second range 32" as soon as the strength of the second identification signal indicates that the secondary mobile unit 26 is less than the predetermined boundary distance from the detection device 18.

As stated above, the controller 16 changes the state of one or more closures 12 of the vehicle 10 when the detection device 18 detects that the secondary mobile unit 26 is within the second range 32 while the primary mobile unit 24 is detected as being within the first range 30. Thus, if the primary mobile unit 24 moves out of the first range 30 before the secondary mobile unit 26 enters the second range 32, the controller 16 will not change the state of the closure 12. In one embodiment, the controller 16 changes the state of one of the closures 12 by changing the locking mechanism 14 from a locked state to unlocked-standby state. Thus, assuming the primary mobile unit 24 is within the first range 30 and assuming that a user approaches the driver's side door with the secondary mobile unit 26 while the primary mobile unit remains in the first range 30, the secondary mobile unit 26 will enter the second range 32 adjacent the driver's side door. The controller 16 will then cause the locking mechanism 14 of the driver's side door to change from a locked state to an unlocked-standby state. Then, the locking mechanism 14 will unlock and the driver's side door can be opened by pulling on the door handle of the driver's side door as described in co-owned U.S. Patent Application Publication No. 2004/0119628, which is hereby incorporated by reference. More specifically, the locking mechanism 14 includes a contact sensor, and once the door handle is contacted, the closure 12 changes from an unlock-standby state to an unlocked state so that the closure 12 can be opened.

Thus, if the driver of the vehicle 10 approaches the vehicle 10 with the primary mobile unit 24, and a passenger of the vehicle 10 approaches the vehicle with a secondary mobile unit 26 while the primary mobile unit 24 is within the first range 30, those passengers will be able to open the closures 12 of the vehicle 10 and enter the vehicle 10 even if the driver is not immediately adjacent the vehicle 10 but he is still within the first range 30. It will be appreciated that the second mobile unit 26 could be affixed to the clothing of a frequent passenger of the vehicle 10. For instance, a driver can affix the secondary mobile unit 26 to a passenger's clothing, watch, or other suitable place. As such, the passenger can run ahead of the driver and enter the vehicle before the driver arrives at the vehicle 10.

Referring now to FIG. 2, a flowchart representing a method 34 of operating the vehicle closure control apparatus 11 is illustrated. The method 34 begins in step 36 in which the primary interrogation signal is transmitted by the primary antenna 20 of the detection device 18. In one embodiment, the primary interrogation signal is transmitted in a polling fashion in step 36. The method 34 continues to decision block 38 in which it is determined whether the primary mobile unit 24 is detected within the first range 30. If the primary mobile unit 24 is outside the first range 30, decision block 38 loops back on itself as shown in FIG. 2. If the primary mobile unit 24 is within the first range 30, the method 34 continues to decision block 40, in which it is determined whether the second mobile unit 26 is within one of the second ranges 32. If the secondary mobile unit 26 is outside one of the second ranges 32, decision block 40 loops back to block 38 to determine if the primary mobile unit 24 is still within the first range 30. If the secondary mobile unit 26 is located within one of the second ranges 32 while the primary mobile unit 24 is being detected within the first range 30, the method 34 continues to step 42 in which the state of the closure 12 is changed.

As stated above, step 42 can involve changing the state of the closure 12 from a locked state to an unlock-standby state. Then, a user can unlock and open the closure 12 by pulling on the door handle of the closure 12 as described in U.S. Patent Application Publication No. 2004/0119628, which is hereby incorporated by reference.

In one embodiment, step 42 of the method 34 is accomplished by changing the state of the closure 12 from a closed state to an open state. In one embodiment, the controller 16 automatically opens the vehicle closure 12 in a manner disclosed in co-owned patent application Ser. No. 11/301,076, filed Dec. 12, 2005, which is hereby incorporated by reference. In this embodiment, the vehicle 10 includes a closure release solenoid 44 and an actuator 46. In the embodiment shown in FIG. 1, the solenoid 44 and the actuator 46 are shown associated with the trunk closure 12b. However, it will be appreciated that the solenoid 44 and actuator 46 could be associated with any of the closures 12. The closure release solenoid 44 causes the associated locking mechanism 14 to unlock the corresponding closure 12 so that the closure 12 is capable of being opened. Although the closure release solenoid 44 is described as the means of unlatching, any type of unlatching means could be employed, such as electric or magnetic latching. Once the closure 12 is unlatched, the actuator 46 releases stored energy from a biasing member or other energy storage device to actuate the closure 12 and cause the vehicle closure 12 to open automatically. As such, when the secondary mobile unit 26 enters the second range 32, the corresponding vehicle closure 12 automatically opens for the convenience of the user. It will be appreciated that the user could affix the secondary mobile unit 26 to large items. For instance, the secondary mobile unit 26 could be affixed to a set of golf clubs, a car seat, or other similar object. As the user approaches 12 the vehicle 10 with the primary mobile unit 24 and with the secondary mobile unit 26 affixed to the large item, the vehicle closure 12 will automatically open for the convenience of the user. For instance, a sliding door on a minivan may be the vehicle closure 12 in this instance, facilitating placement of the large item, such as golf clubs, into the minivan through the opening created by the sliding door in its open position.

To allow the user to enter the vehicle 10 without having a secondary mobile unit 26, the detection device 18 is further operable to detect whether the primary mobile unit 24 is within a third range 48 of the vehicle 10. As shown in FIG. 1, the boundary of the third range 48 is within close proximity to the vehicle 10. In one embodiment, the boundary of the third range 48 is three to five feet from the vehicle 10. Once the primary mobile unit 24 enters one of the third ranges 48, the controller 16 is operable to change the state of the corresponding vehicle closure 12, even if the second mobile unit 26 is outside the second range 32.

In one embodiment, the detection device 18 transmits a third interrogation signal within the third range. In one embodiment, the third interrogation signal is a low frequency (LF) signal. The primary mobile unit 24 responds by transmitting a third identification signal, and the detection device 18 matches the third identification signal to a predetermined identifier, such as a code stored in memory. If the third identification signal matches the predetermined identifier, the detection device 18 has validated the primary mobile unit 24 and has detected that the primary mobile unit 24 is within one of the third ranges 48. Subsequently, the controller 16 changes the state of the vehicle closure 12 from a locked state to a unlocked-standby state, automatically opens the door, or otherwise changes the state of the vehicle closure 12 in the manner described above.

In another embodiment, the detection device 18 determines the distance between the detection device 18 and the primary mobile unit 24 based on the strength of the primary identification signal in a manner that is generally known in he art. As such, the boundary of the third range 48 is a predetermined distance, and the primary mobile unit 24 effectively "enters the third range 48" as soon as the strength of the primary identification signal indicates that the primary mobile unit 24 is within the predetermined boundary distance from the detection device 18.

Referring now to FIG. 3, another embodiment of the method 134 of operating the vehicle closure control apparatus 11 is disclosed, wherein like numerals increased by 100 identify steps that correspond to those of FIG. 2. As shown, the method 134 begins with decision block 135, in which it is determined whether a handle of one of the closures 12 has been pulled. If a handle has not been pulled, decision block 135 loops back upon itself. Once a handle is pulled, the method 134 continues to decision block 137, in which it is determined whether the primary unit 24 is within the third range 48. If the primary mobile unit 24 is within the third range 48, the method 134 continues to step 142 in which the vehicle closure 12 is unlocked, automatically opened, or otherwise affected. In one embodiment, step 142 involves changing the state of the closure 12 where the handle pull occurred in step 135. If the primary mobile unit 24 is outside the third zone 48, the method 134 continues to decision block 138, in which it is determined whether the primary mobile unit 24 is within the first range 30. If the primary mobile unit 24 is outside the first range 30, decision block 138 loops back upon itself. If the primary mobile unit 24 is within the first range 30, the method 134 continues to decision block 140, in which it is determined whether the secondary mobile unit 26 is within the second range 32. If the secondary mobile unit 26 is outside the second range 32, decision block 140 loops back to block 138 to determine if the primary mobile unit 24 is still within first range 30. If the secondary mobile unit 26 is within one of the second ranges 32 while the primary mobile unit 24 is being detected within the first range 30, the method 134 continues to step 142, in which the closure 12 is unlocked, automatically opened, or otherwise changed. In one embodiment, only the closure 12 where the handle was pulled is affected in step 142.

Figure 4:
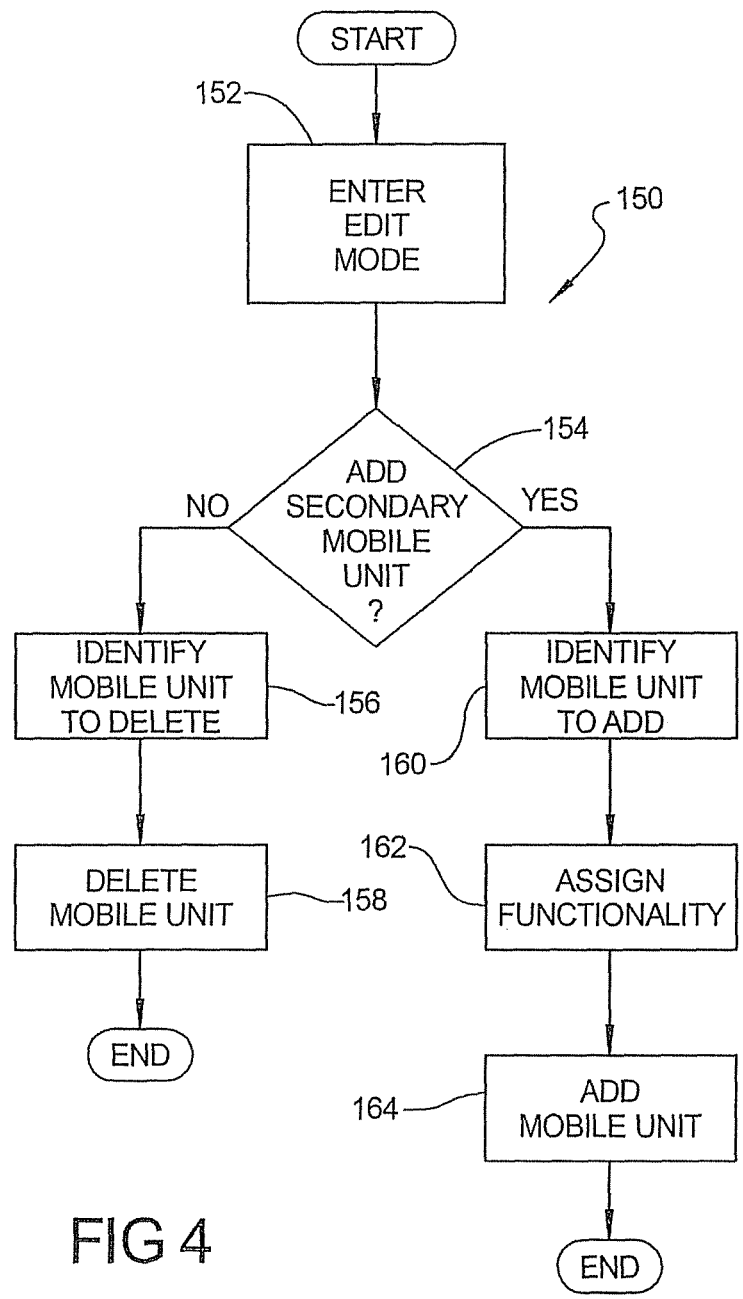
FIG. 4 is a flow chart of a method of programming the vehicle closure control apparatus of FIG. 1.

Furthermore, the detection device 18 is programmable to allow a change to the number of secondary mobile devices 26 that are recognized by the detection device 18. For instance, FIG. 4 illustrates a method 150 of programming the detection device 18. As shown, the method 150 begins in step 152, in which the detection device 18 enters an edit mode. In one embodiment, the user provides an input, such as pressing a button with the primary mobile device being present, to cause the detection device 18 to enter the edit mode. The method 150 then continues to decision block 154 in which it is determined whether the user would like to add or delete a secondary mobile unit 26. If a user would like to delete a secondary mobile unit 26 that is recognized by the detection device 18, the method 150 continues to step 156, in which the secondary mobile unit 26 that the user would like to delete is identified. To identify the secondary mobile unit 26 that will be deleted, the detection device transmits the energizing signal, and the secondary mobile unit responds by transmitting the second identification signal. Then, the detection device 18 records that second identification signal. In another embodiment, the user manually types in an identifier for the secondary mobile unit 26 that is to be deleted. Then, the method 150 continues to step 158, in which the detection device 18 deletes the secondary mobile unit 26 from its list of recognized secondary mobile units 26. Subsequently, the deleted secondary mobile unit 26 will not be recognized by the detection device 18 even if it enters one of the second ranges 32.

If the user would like to add a secondary mobile unit 26 in decision block 154, the method 150 continues to step 160, in which the secondary mobile unit 26 that is to be added is identified. Step 160 can be completed in the same manner as step 156 described above. Then, in step 162, the user assigns functionality to the secondary mobile unit 26. For instance, in one embodiment, in step 162, the user decides whether the added secondary mobile unit 26 will cause the closure 12 to unlock and/or whether the added secondary mobile unit 26 will cause the closure 12 to automatically open. After functionality is assigned to the secondary mobile unit 26, the method 150 continues to step 164, in which the secondary mobile unit 26 is added to the memory of the detection device 18. Accordingly, the user can add and/or delete secondary mobile units 26 from the vehicle closure control apparatus 11 for more convenience.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A system for changing the state of a vehicle closure of a vehicle, the system comprising:
a primary mobile unit;
a secondary mobile unit completely separate from the primary mobile unit;
a detection device operable to automatically detect:
whether the primary mobile unit is within a first range of the detection device outside of the vehicle;
whether the secondary mobile unit is within a second range of the detection device outside of the vehicle, the second range being smaller than the first range, and the first range extending further from the vehicle than the second range; and
whether the primary mobile unit is within a third range of the detection device outside of the vehicle, the third range being smaller than, and closer to the vehicle than, each of the first range and the second range;
a controller operable to change the state of the vehicle closure when the detection device detects that:
the secondary mobile unit is within the second range while the primary mobile unit is within the first range and outside of both the second range and the third range; or
the primary mobile unit is within the third range and the secondary mobile unit is outside of the third range.

2. The system of claim 1, wherein the detection device is operable to transmit a primary interrogation signal, and wherein the primary mobile unit is operable to transmit a primary identification signal in response to the primary interrogation signal when the primary mobile unit is within the first range, and wherein the detection device is further operable to match the primary identification signal to a predetermined primary identifier to thereby detect whether the primary mobile unit is within the first range of the vehicle.

3. The system of claim 2, wherein the secondary mobile unit is operable to transmit a secondary identification signal, and wherein the detection device matches the second identification signal to a predetermined second identifier to thereby detect whether the secondary mobile unit is within the second range of the vehicle.

4. The system of claim 3, wherein the detection device transmits an energizing signal only after the primary mobile unit is detected within the first range of the vehicle.

5. The system of claim 1, wherein the detection device is operable to detect the distance between the detection device and at least one of the primary mobile unit and the secondary mobile unit, and wherein the controller is operable to change the state of the vehicle closure when the detection device detects that the at least one of the primary mobile unit and the secondary mobile unit is less than a predetermined distance from the detection device.

6. The system of claim 1, wherein the detection device is programmable to allow a change to the number of secondary mobile devices that can be detected within the second range by the detection device.

7. The system of claim 1, wherein the controller is operable to change the state of the vehicle closure from a locked state to an unlocked-standby state.

8. The system of claim 1, wherein the controller is operable to change the state of the vehicle closure from a closed state to an open state.

9. The system of claim 1, wherein the controller is operable to change the state of the vehicle closure when the detection device detects that the secondary mobile unit is within the second range while the primary mobile unit is within the first range, the second range, or the third range.

10. The system of claim 1, wherein the controller is operable to change the state of the vehicle closure when the detection device detects that the primary mobile unit is within the third range and the secondary mobile unit is outside of the second range.

11. A method of changing the state of a vehicle closure of a vehicle, the method comprising:
  detecting when a primary mobile unit is within a first range of a detection device outside of the vehicle;
  detecting when a secondary mobile unit, completely separate from the primary mobile unit, is within a second range of the detection device outside of the vehicle, the second range being smaller than the first range, and the first range extending further from the vehicle than the second range;
  detecting when the primary mobile unit is within a third range of the detection device outside of the vehicle, the third range being smaller than, and closer to the vehicle than, each of the first range and the second range;
  changing the state of the vehicle closure when the secondary mobile unit is detected within the second range while the primary mobile unit is being detected within the first range and outside of both the second range and the third range; and
  changing the state of the vehicle closure when the primary mobile unit is within the third range and the secondary mobile unit is outside of the third range.

12. The method of claim 11, wherein the step of detecting when the primary mobile unit is within the first range comprises:
  transmitting a primary interrogation signal;
  transmitting a primary identification signal in response to the primary interrogation signal; and
  matching the primary identification signal to a predetermined primary identifier.

13. The method of claim 11, wherein the step of detecting when the secondary mobile unit is within the second range comprises:
  transmitting an energizing signal;
  obtaining energy from the energizing signal;
  transmitting a secondary identification signal; and
  matching the secondary identification signal to a predetermined secondary identifier.

14. The method of claim 13, wherein the step of transmitting an energizing signal occurs after the primary mobile unit is detected within the first range.

15. The method of claim 11, further comprising the steps of detecting the distance between the detection device and at least one of the primary mobile unit and the secondary mobile unit, and wherein the step of changing the state of the vehicle closure comprises changing the state of the vehicle closure when the at least one of the primary mobile unit and the secondary mobile unit is less than a predetermined distance from the detection device.

16. The method of claim 11, wherein the step of changing the state of the vehicle closure comprises at least one of changing the state of the vehicle closure from a locked state to an unlocked-standby state and changing the state of the vehicle closure from a closed state to an open state.

17. The system of claim 11, further comprising changing the state of the vehicle closure when the secondary mobile unit is within the second range while the primary mobile unit is within the first range, the second range, or the third range.

18. The method of claim 11, further comprising changing the state of the vehicle closure when the primary mobile unit is within the third range and the secondary mobile unit is outside of the second range.

19. A system for changing the state of a vehicle closure of a vehicle, the apparatus comprising:
  a primary mobile unit;
  a secondary mobile unit completely separate from the primary mobile unit;
  a detection device operable to transmit a primary interrogation signal within a first range outside of the vehicle and an energizing signal within a second range outside of the vehicle, the second range being smaller than the first range;
  wherein the primary mobile unit is operable to transmit a primary identification signal in response to the primary interrogation signal, wherein the secondary mobile unit is operable to obtain energy from the energizing signal and transmit a secondary identification signal;
  wherein the detection device detects whether the primary mobile unit is within the first range by matching the primary identification signal to a predetermined primary identifier;
  wherein the detection device detects whether the secondary mobile unit is within the second range by matching the secondary identification signal to a predetermined secondary identifier;
  wherein the detection device is operable to transmit a third interrogation signal within a third range outside the vehicle that is smaller than, and closer to the vehicle than, each one of the first range and the second range, wherein the primary mobile unit is operable to transmit a third identification signal in response to the third interrogation signal; and
  wherein the detection device detects whether the primary mobile unit is within the third range by matching the third identification signal to a predetermined third identifier;
  a controller operable to change the state of the vehicle closure when the detection device detects the following: the secondary mobile unit is within the second range while the primary mobile unit is being detected within the first range and outside of both the second and third ranges; or the primary mobile unit is within the third range and the secondary mobile unit is outside of the third range;

wherein the state of the vehicle closure changes by at least one of changing the state of the vehicle closure from a locked state to an unlocked-standby state and changing the state of the vehicle closure from a closed state to an open state.

20. The system of claim 19, wherein the detection device is further operable to detect the distance between the detection device and at least one of the primary mobile unit and the secondary mobile unit, and wherein the controller is operable to change the state of the vehicle closure when the detection device detects that the at least one of the primary mobile unit and the secondary mobile unit is less than a predetermined distance from the detection device.

21. The system of claim 19, wherein the detection device is further operable to detect whether the primary mobile unit is within a third range of the vehicle, and wherein the controller is further operable to change the state of the vehicle closure when the detection device detects that the primary mobile unit is within the third range.

22. The system of claim 19, wherein the controller is operable to change the state of the vehicle closure when the detection device detects the secondary mobile unit is within the second range while the primary mobile using is detected within the first range, the second range, or the third range.

23. The system of claim 19, wherein the controller is operable to change the state of the vehicle closure when the detection device detects that the primary mobile unit is within the third range and the secondary mobile unit is outside of the second range.

\* \* \* \* \*